(12) United States Patent
Sekiguchi

(10) Patent No.: US 9,556,944 B2
(45) Date of Patent: Jan. 31, 2017

(54) VIBRATION DAMPING DEVICE

(71) Applicant: TOYOTA JIDOSHA KABUSHIKI KAISHA, Toyota-shi (JP)

(72) Inventor: Tadashi Sekiguchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/037,890

(22) PCT Filed: Nov. 7, 2014

(86) PCT No.: PCT/JP2014/079531
§ 371 (c)(1),
(2) Date: May 19, 2016

(87) PCT Pub. No.: WO2015/076119
PCT Pub. Date: May 28, 2015

(65) Prior Publication Data
US 2016/0281830 A1 Sep. 29, 2016

(30) Foreign Application Priority Data

Nov. 22, 2013 (JP) .................................. 2013-241450

(51) Int. Cl.
F16H 45/02 (2006.01)
F16F 15/14 (2006.01)
F16D 65/00 (2006.01)

(52) U.S. Cl.
CPC ............. *F16H 45/02* (2013.01); *F16F 15/145* (2013.01); *F16D 65/0012* (2013.01);
(Continued)

(58) Field of Classification Search
None
See application file for complete search history.

(56) References Cited

U.S. PATENT DOCUMENTS 6,050,376 A * 4/2000 Yabe ...................... F16H 45/02
192/213.1
6,126,568 A * 10/2000 Sudau ..................... F16H 45/02
192/212
(Continued)

FOREIGN PATENT DOCUMENTS

DE 100 05 548 A1 8/2001
JP 11-311309 A 11/1999
(Continued)

OTHER PUBLICATIONS

International Search Report Issued Dec. 22, 2014 in PCT/JP2014/079531 Filed Nov. 7, 2014.

*Primary Examiner* — Colby M Hansen
(74) *Attorney, Agent, or Firm* — Oblon, McClelland, Maier & Neustadt, L.L.P.

(57) ABSTRACT

A vibration damping device having improved air-tightness of a chamber holding a rolling mass in an oscillatable manner is provided. A cover member that covers an oscillating range of the rolling mass liquid-tightly or air-tightly comprises a first flange and a second flange. The first flange is pushed onto one of lateral faces of a holding member by a first pushing member fitted onto a rotary member while being prevented to move axially to seal a clearance between the holding member and the first flange by a first sealing member. The second flange is pushed onto the other lateral face of the holding member by a second pushing member fitted onto the rotary member while being prevented to move axially to seal a clearance between the holding member and the second flange by a second sealing member.

7 Claims, 3 Drawing Sheets

(52) U.S. Cl.
CPC ...... *F16D 65/0018* (2013.01); *F16D 2300/22* (2013.01); *F16H 2045/0263* (2013.01)

(56) References Cited

U.S. PATENT DOCUMENTS

| | | | |
|---|---|---|---|
| 6,280,330 B1 | 8/2001 | Eckel et al. | |
| 2002/0056599 A1* | 5/2002 | Suzuki | F16H 45/02 192/3.25 |
| 2010/0242466 A1 | 9/2010 | Krause et al. | |
| 2011/0240429 A1* | 10/2011 | Heuler | F16F 15/145 192/3.28 |
| 2014/0374207 A1 | 12/2014 | Amano | |
| 2015/0005078 A1 | 1/2015 | Sekiguchi et al. | |

FOREIGN PATENT DOCUMENTS

| | | |
|---|---|---|
| JP | 2000-46119 A | 2/2000 |
| JP | 2011-504987 A | 2/2011 |
| JP | 2012-197886 A | 10/2012 |
| JP | 2014-122645 A | 7/2014 |
| WO | 2013/128590 A1 | 9/2013 |
| WO | 2013/161058 A1 | 10/2013 |

\* cited by examiner

VIBRATION DAMPING DEVICE

TECHNICAL FIELD

This invention relates to the art of a vibration damping device for damping torsional vibrations, and especially to a vibration damping device in which a rolling mass is held in a rotary member while being allowed to rotate relatively therewith.

BACKGROUND ART

A rotary member such as a gear, a driveshaft etc. for transmitting torque of a prime mover to a predetermined portion or member is vibrated inevitably by a torque pulse, a change in a load, and friction and so on, and frequency of vibrations is changed depending on a rotational speed. In this situation, higher vibrations such as secondary vibrations are also generated. Amplitude of vibrations of the rotary member thus generated may be increased by resonance, and if amplitude of the vibrations of the rotary member is increased, the rotary member may be damaged and noise may be increased. In order to avoid such disadvantages, a vibration damper device or mechanism is widely used in various kinds of rotary power transmission devices.

For example, a dynamic damper is known as a device for damping torsional vibrations of the rotary member. In the dynamic damper, a rolling mass is oscillated by torque pulses of a rotary shaft, and the vibrations of the rotary shaft are suppressed by an oscillating motion of the rolling mass. If such oscillation of the rolling mass is restricted by an increase in viscosity of oil or the like, vibration damping performance of the dynamic damper may be restricted. Likewise, if contaminants are interposed between the rotary member and the rolling mass, the vibration damping performance of the dynamic damper may also be restricted.

One example of the dynamic damper adapted to prevent hindrance of oscillation of the rolling mass is described in Japanese Patent Laid-Open No. 2012-197886. According to the teachings of Japanese Patent Laid-Open No. 2012-197886, the dynamic damper is held in a torque converter connected to an output shaft of an engine. The torque converter is provided with a lockup clutch, and an output torque of the engine is delivered to an input shaft of a transmission through the oil and the lockup clutch. Specifically, the dynamic damper is disposed on the input shaft of the transmission inserted into the torque converter. In order not to hinder the oscillation of the rolling mass by the oil in the torque converter, an oscillation range of the rolling mass is covered liquid-tightly by a cover member. The cover member is comprised of an annular first cover member opening toward the engine in an axial direction that is rotated together with a rotary shaft, and a second cover member that is fitted into the opening of the first cover member through a sealing member while being allowed to move in the axial direction. The rolling mass is enclosed by the first cover member and the second cover member while being allowed to oscillate therein. That is, a holding chamber is formed by the first cover member and the second cover, and the holding chamber is sealed liquid-tightly by the sealing member.

Japanese Patent Laid-Open No. 2011-504987 also describes a dynamic damper in which a rolling mass is held oscillatably by a plate member rotated together with a turbine runner of a torque converter. Japanese Patent Laid-Open No. 11-311309 also describes a dynamic damper in which a rolling mass is held in a chamber formed in the torque converter close to an engine. In the chamber, a through hole is formed on a wall of the chamber to provide a connection between an inner space of the chamber and an inner space of the torque converter.

In the dynamic damper taught by Japanese Patent Laid-Open No. 2012-197886 in which the second cover member is fitted into the opening of the first cover member in a movable manner, a pushing force for pushing the sealing member interposed between the first cover member and the second cover member may not be ensured sufficiently. For this reason, a clearance between the first cover member and the second cover member may not be sealed sufficiently liquid-tightly, and hence the oil may intrude into the chamber.

In the dynamic damper taught by Japanese Patent Laid-Open No. 2011-504987 in which the member is held by the plate member, the plate member is basically made of material having relatively high strength. If the chamber is formed by combining a cover member with the plate member made of high strength material, the cover member is not required to have especially high strength and hence the cover member may be made of different metal material. In this case, it would be difficult to connect the cover member to the plate member by a welding method. In addition, if the chamber is formed by attaching the cover members on both sides of the plate member through the sealing member, more bolts are required to compress the sealing member sufficiently. Further, in the chamber in which the sealing member interposed between the cover member and the plate member is pushed from both sides of the plate member, if the plate member or the cover member is inclined for any reason, the cover member may be subjected to a pulling force to be isolated away from the plate member and hence a sealing tightness may not be ensured.

DISCLOSURE OF THE INVENTION

The present invention has been conceived nothing the foregoing technical problems, and it is therefore an object of embodiments of the present invention is to provide a vibration damping device having improved air-tightness and liquid-tightness of a chamber holding a rolling mass in an oscillatable manner.

An embodiment of the present application relates to a vibration damping device, comprising: a holding member that is fitted onto a rotary member to suppress torsional vibrations on the rotary member while expanding radially outwardly; a rolling mass that is held in the holding member while being allowed to oscillate in a rotational direction of the rotary member, and a cover member that covers an oscillating range of the rolling mass liquid-tightly or air-tightly. In order to achieve the above-explained objective, according to the embodiment of the present application, the cover member is provided with a protrusion covering the oscillating range of the rolling mass in an oscillatable manner, a first flange that extends from the protrusion toward an inner circumferential side of the oscillating range on one of lateral faces of the holding member through a first sealing member, and a second flange that extends from the protrusion toward the inner circumferential side of the oscillating range on the other lateral face of the holding member through a second sealing member. In addition, the vibration damping device is provided with: a first pushing member that is fitted onto the rotary member while being prevented to move in an axial direction to push the first flange toward said one of lateral faces of the holding member to compress the first sealing member between the first flange and the holding member; and a second pushing member that is fitted onto the rotary member while being prevented to move in the axial direction to push the second flange toward the other lateral face of the holding member to compress the second sealing member between the second flange and the holding member.

According to the embodiment, the holding member may be disposed between the first pushing member and the second pushing member.

According to the embodiment, the vibration damping device may be further provided with: a fluid coupling that hydraulically transmits an output torque of a prime mover to the rotary member; and a lockup clutch that transmits the output torque of the prime mover to the rotary member without the fluid coupling when it is engaged. In addition, the first pushing member may include a first connection member that transmits the output torque of the prime mover through the lockup clutch, and the second pushing member may include a second connection member that transmits the output torque of the prime mover through the fluid coupling.

According to the embodiment, the first pushing member may be adapted to push the first flange at a level where the first sealing member is situated, and the second pushing member may be adapted to push the second flange at a level where the second sealing member is situated.

According to the embodiment, any one of the first pushing member and the second pushing member may be integrated with the rotary member. In addition, the vibration damping device may be further provided with a positioning member that fixes a position of an end face of any one of the other first pushing member and second pushing member opposite to a face thereof opposed to said one of the first pushing member and the second pushing member. That is, the first flange is pushed by the first pushing member and the second flange is pushed by the second pushing member as a result of fixing the position of the end face of said any one of the other first pushing member and second pushing member.

According to the embodiment of the present application, therefore, the flanges are individually pushed toward the holding member by the first pushing member and the second pushing member. Consequently, the sealing members are compressed by the flanges to enhance sealing ability of the cover member holding the rolling mass liquid-tightly or air-tightly.

In addition, the flanges and the holding member may be tightened in an axial direction. That is, a clearance between the flange and the holding member will not be widened even if the holding member or the flanges are subjected to an axial load. Therefore, a compressing load applied to the sealing member will not be reduced to maintain the sealing ability of the cover member.

Further, any one of the first pushing member and the second pushing member may be integrated with the rotary member, and the axial position of the end face of any one of the other first pushing member and second pushing member may be fixed by the positioning member. Therefore, the sealing members may be compressed by the flanges as a result of fixing the axial position of the end face of said any one of the other first pushing member and second pushing member. For this reason, the flanges and the pushing member may be assembled easily.

DESCRIPTION OF THE PREFERRED EMBODIMENT(S)

Figure 1:
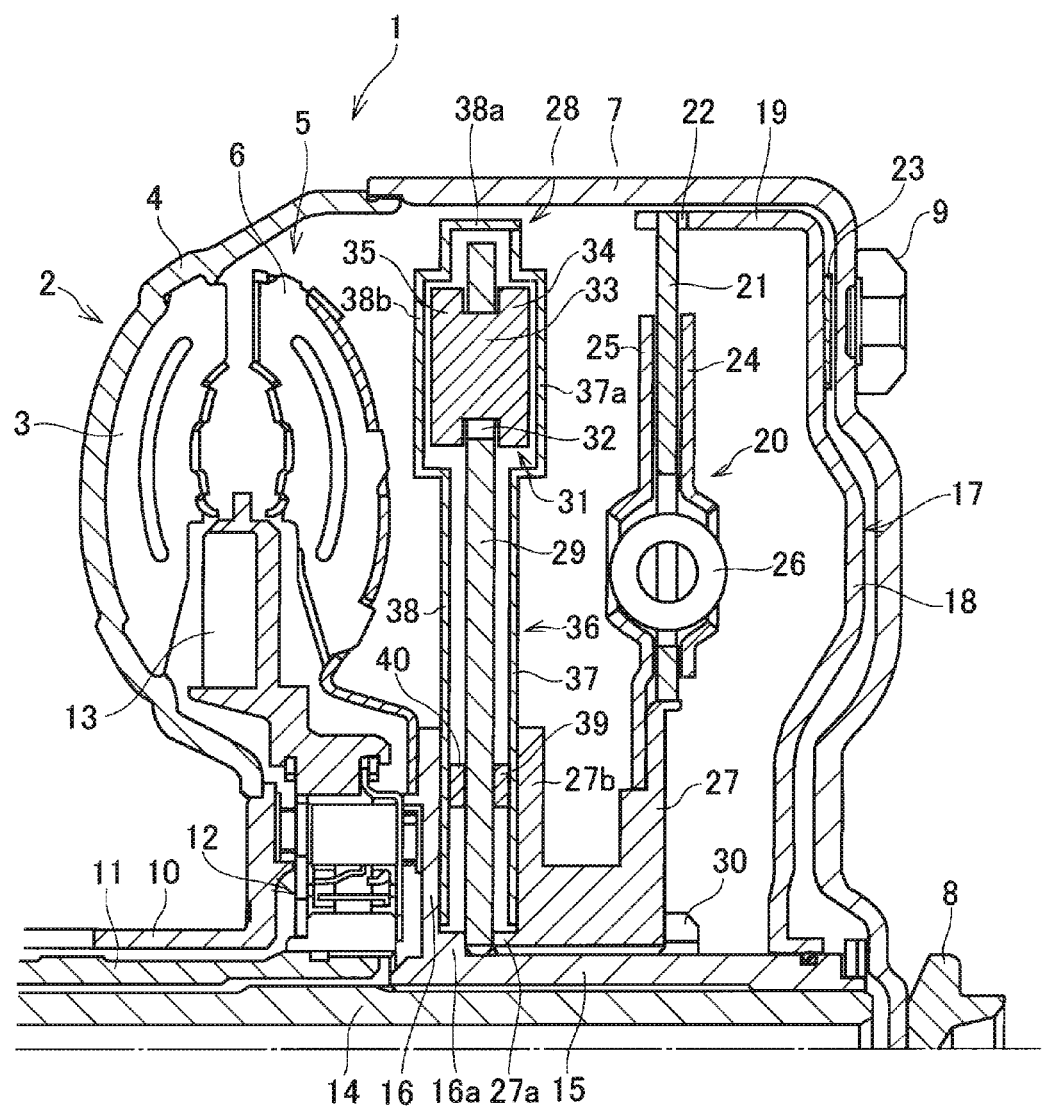
FIG. 1 is a cross-sectional view of the vibration damping device according to the preferred embodiment.

A preferred embodiment of the vibration damping according to the present application will be explained hereinafter. Refereeing now to FIG. 1, there is shown an example in which a vibration damper is arranged in a fluid coupling (as will be called the "torque converter hereinafter") 1 having a torque multiplication function. A structure of the torque converter 1 is similar to that of the conventional torque converter used in automobiles. Specifically, a plurality of pump blades 3 are attached to an inner surface of a pump impeller 2 as an input member in a circular manner, and a turbine runner 5 is opposed axially to the pump impeller 2. A configuration of the turbine runner 5 is substantially symmetrical with that of the pump impeller 2. Specifically, a plurality of turbine blades 6 are attached to an inner surface of an annular (or a halved doughnut) shell in a circular manner.

A front cover 7 covering the turbine runner 5 from outside is joined integrally with an outer circumferential end of the pump shell 4. As shown in FIG. 1, the front cover 7 is a bottomed-cylindrical member comprising a front wall facing to the inner face of the pump shell 4, and oil is encapsulated inside of the front cover 7. The pump impeller 2 is rotated by the power transmitted thereto, and the turbine runner 5 is rotated to transmit the power through a spiral oil flow in the front cover 7 resulting from rotating the turbine runner 5. A cylindrical member 8 is formed in the center of the front cover 7 to protrude outwardly from the front cover 7, and a not shown output shaft of an engine is inserted into the cylindrical member 8. The front cover 7 is fixed with a not shown drive plate that is rotated integrally with the output shaft of the engine at a plurality of outer circumferential portions by a plurality of nuts 9. Therefore, the front cover 7 is rotated together with the drive plate by the power from the output shaft.

A cylindrical shaft 10 is joined integrally with an inner circumferential end of the pump shell 4. The cylindrical shaft 10 extends toward a back side (i.e., toward an opposite side of the engine), and connected with an oil pump not shown. In addition, a fixed shaft 11 is inserted into the cylindrical shaft 10. Specifically, an outer diameter of the fixed shaft 11 is smaller than an inner diameter of the cylindrical shaft 10, and a leading end portion of the fixed shaft 11 is inserted into an inner space of the torque converter 1 enclosed by the pump shell 4 and the front cover 7.

More specifically, the leading end portion of the fixed shaft 11 is situated at an inner circumferential side of the turbine runner 5 between the pump impeller 2 and the turbine runner 5, and splined to an inner race of a one-way clutch 12. In addition, a stator 13 is disposed between an inner circumferential portion of the pump impeller 2 and an inner circumferential portion of the turbine runner 5, and the stator 13 is fitted onto an outer race of the one-way clutch 12. Therefore, provided that a ratio between a speed of the pump impeller 2 and a speed of the turbine runner 5 is small, a rotation of the stator 13 can be stopped by the one-way clutch 12 even if the oil flowing out of the turbine runner 5 acts on the stator 13. As a result, a flowing direction of the oil is changed to a direction to deliver the oil to the pump impeller 2. By contrast, provided that the ratio between the speed of the pump impeller 2 and the speed of the turbine runner 5 becomes large, the oil is poured to a back face of the stator 13. In this situation, therefore, the stator 13 is rotated not to disturb the flow of the oil.

An output shaft 14 (i.e., an input shaft of not shown transmission) is inserted into the fixed shaft 11 in a rotatable manner. A leading end portion of the output shaft 14 protrudes from the leading end of the fixed shaft 11 to the vicinity of the inner surface of the front cover 7 so that the protruding portion of the output shaft 14 is splined to a hub shaft 15. On the hub shaft 15, a flange-shaped hub 16 is formed to protrude outwardly at a portion close to the transmission, that is, close to the turbine runner 5 in FIG. 1, and the turbine runner 5 is connected to the turbine hub 16. Accordingly, output torque of the engine is delivered to the hub shaft 15 through the pump impeller 2 and the turbine runner 5, and further delivered from the hub shaft 15 to the output shaft 14.

Given that the speed ratio between the pump impeller 2 and the turbine runner 5 is large, the output torque of the engine can be transmitted directly to the output shaft 14 without an intervention of the oil by engaging a lockup clutch. Here will be briefly explained a structure of the lockup clutch 17 shown in FIG. 17. The lockup clutch 17 comprises an annular lockup piston 18 opposed to the front cover 7, and the lockup clutch 17 is fitted onto a leading end of the hub shaft 15 while being allowed to reciprocate depending on a pressure difference between a front and rear faces thereof. An outer circumferential portion of the lockup piston 18 is bent along an inner surface of the front cover 7. The cylindrical portion 19 is joined to an input plate 21 of a below-mentioned torsional damper 20 to be rotated integrally therewith, and a through hole 22 to which the input plate 21 is inserted is formed on the cylindrical portion 19. Since the lockup piston 18 is allowed to reciprocate in the axial direction, the through hole 22 is also reciprocated in the axial direction together with the input plate 21. A friction member 23 is attached to an outer circumferential side of the lockup piston 18 to be brought into contact to the front cover 7. Specifically, the friction member 22 is brought into contact to an inner surface of the front cover 7 to transmit torque therebetween when the lockup piston 18 is moved toward the front cover 7.

Deterioration in the output torque transmitted through the lockup piston 18 is further transmitted to the hub shaft 15 via a torsional damper 20. As the conventional torsional dampers, the torsional damper 20 comprises an annular first output plate 24 and an annular second output plate 25, and the above-mentioned input plate 21 is interposed therebetween. Specifically, the first output plate 24 faces to a face of the input plate 21 of the engine side in such a manner as to rotate relatively therewith, and the second output plate 25 faces to a face of the input plate 21 of the transmission side in such a manner as to rotate relatively therewith. In addition, the first output plate 24 and the second output plate 25 are connected to each other through a not shown rivet or the like in such a manner as to rotate integrally. The torque applied to the input plate 21 is delivered to the output plates 24 and 25 through coil springs 26 individually compressed in a circumferential direction. Therefore, pulsations of the torque transmitted from the input plate 21 to the output plates 24 and 25 can be absorbed by the coil springs 26.

The torque delivered from the lockup piston 18 to the torsional damper 20 is further delivered to the hub shaft 15 through a damper hub 27 integrated with the second output plate 25. Specifically, the damper hub 27 is attached to the second output plate 25 by welding, bonding or a rivet, and splined onto the hub shaft 15 to be rotated integrally therewith. Alternatively, in order to rotate the hub shaft 15 together with the damper hub 27, the hub shaft 15 may also be inserted into the damper hub 27 by a press-fitting method.

Thus, pulsation of the output torque of the engine transmitted from the lockup piston 18 is damped by the torsional damper 20, and further transmitted to the output shaft 14 through the damper hub 27 and the hub shaft 15.

In order to suppress pulsations of torque transmitted through the turbine runner 5 and the lockup clutch 17, and torsional vibrations on the rotary shafts, the vibration damping device is further provided with a dynamic damper 28. The dynamic damper 28 is adapted to suppress torsional vibrations of the rotary shafts by an oscillating motion of each of the rolling mass caused by torque pulses. In the example shown in FIG. 1, the dynamic damper 28 is also fitted onto the hub shaft 15. Specifically, an annular plate 29 is splined onto the hub shaft 15 between the damper hub 27 and a turbine hub 16. That is, the annular plate 29 is fitted onto the hub shaft 15 first, and then the damper hub 27 is fitted onto the hub shaft 15. To this end, in the example shown in FIG. 1, a positioning step 16a is formed on the turbine hub 16. Specifically, the positioning step 16a is protruded toward the engine, and an outer diameter of the positioning step 16a is larger than that of the hub shaft 15 to be brought into abutment with an inner circumferential end of the annular plate 29. In order to push the inner circumferential end of the annular plate toward the turbine hub 16, a first pushing portion 27a protruding toward the turbine hub 16 is formed on the damper hub 27, and an outer diameter of the first pushing portion 27a is substantially identical to that of the positioning step 16a. In the example shown in FIG. 1, the turbine hub 16, the annular plate 29, and the damper hub 27 are tightened together by fitting a nut 30 onto the hub shaft 15 from the damper hub 27 side. Accordingly, the hub shaft 15 serves as the claimed rotary member.

A rolling mass 31 is held in the annular plate 29 as the claimed holding member in an oscillatable manner. Specifically, a bore 32 having a predetermined width in the circumferential direction is formed on the annular plate 29, and the rolling mass 31 is inserted into the bore 32 while being allowed to oscillate along an outer circumferential edge of the bore 32 as a raceway surface. However, the annular plate 29 may be subjected to a relatively large centrifugal load by the oscillating rolling mass 31. Therefore, the annular plate 29 is formed of relatively high strength material. A curvature radius of the raceway surface of the bore 32 and a distance from a center of the curvature of the raceway surface to a rotational center of the output shaft 14 or the hub shaft 15 are determined in such a manner that the number of oscillation of the rolling mass 31 per rotation is adjusted to the number of torque pulse on the output shaft 14 or the hub shaft 15.

The rolling mass 31 comprises a diametrically smaller intermediate portion 33, a first diametrically larger portion 34 and a second diametrically larger portion 35 formed on both axial ends of the intermediate portion 33. In order to retain the rolling mass 31 in the bore 32, an outer diameter of each of the first diametrically larger portion 34 and the second diametrically larger portion 35 is individually larger than an opening width of the bore 32 in the radial direction. That is, the intermediate portion 33 of the rolling mass 31 rolls along the raceway surface of the bore 32.

In order not to hinder the oscillation of the rolling mass 31 by the oil in the torque converter 1, according to the example shown in FIG. 1, an oscillation range of the rolling mass 31 is covered liquid-tightly by a cover member 36.

The cover member 36 shown in FIG. 1 comprises an annular first cover member 37 covering the annular plate 29 from the engine side, and a second annular cover member 38 covering the annular plate 29 from the transmission side. Specifically, an inner diameter of a center hole of the first cover member 37 is larger than an outer diameter of the first pushing portion 27a, and an inner diameter of a center hole of the second cover member 38 is larger than an outer diameter of the positioning step 16a. In addition, the first cover member 37 is arranged coaxially with the first pushing portion 27a, and the second cover member 38 is arranged coaxially with the positioning step 16a. In other words, the cover member 36 is interposed between the turbine hub 16 and the damper hub 27. Accordingly, an inner circumferential portion of the first cover member 37 serves as the claimed first flange, and an inner circumferential portion of the second cover member 38 serves as the claimed second flange.

The second cover member 38 further comprises a cylindrical portion 38a formed on an outer circumferential end of the second cover member 38 in such a manner as to protrude toward the engine while keeping a predetermined clearance from an outer circumferential edge of the annular plate 29, and a leading end of the cylindrical portion 38a is joined to an outer circumferential edge of the first cover member 37 by a welding method or the like. As described, the cover member 36 is arranged to prevent an intrusion of the oil into the oscillating range of the rolling mass 31. That is, a load (or an oil pressure) applied to the cover member 36 is lighter than that applied to the annular plate 29 and hence the cover member 36 may be formed of material having less strength than that of the annular plate 29. Since the first cover member 37 and the second cover member 38 are formed of the same material, the first cover member 37 and the second cover member 38 can be joined easily to each other by the welding method.

In addition, in order to form a chamber for holding the rolling mass 31, a first protrusion 37a protruding toward the engine is formed on the first cover member 37 in such a manner as to enclose the oscillating range of the rolling mass 31, and a second protrusion 38b protruding toward the transmission is formed on the second cover member 38 in such a manner as to enclose the oscillating range of the rolling mass 31. Accordingly, the protrusions 37a and 38b individually serve as the claimed protrusion. Here, the first protrusion 37a and the second protrusion 38b are formed in such a manner that the oscillating rolling mass 31 will not come into contact therewith.

In order to seal a clearance between the first cover member 37 and the annular plate 29 liquid-tightly or air tightly, a first sealing member 39 such as an O-ring is interposed between an inner circumferential portion of the first cover member 37 and the annular plate 29. Likewise, in order to seal a clearance between the second cover member 38 and the annular plate 29 liquid-tightly or air tightly, a second sealing member 40 such as an O-ring is interposed between an inner circumferential portion of the second cover member 38 and the annular plate 29. Alternatively, a gasket or the like may also be used individually as the first sealing member 39 and the second sealing member 40 instead of the O-ring.

Sealing ability of each of the sealing member 39 and 40 may be improved by increasing an axial pushing force applied to each of the sealing member 39 and 40. According to the example shown in FIG. 1, specifically, the first cover member 37 is pushed toward the annular plate 29 by the damper hub 27. To this end, the damper hub 27 is provided with a second pushing portion 27b as a flange portion for pushing the first cover member 37 from the engine side, and an outer diameter of the second pushing portion 27b is substantially identical to that of the turbine hub 16. That is, the second pushing portion 27b is adapted to push the first cover member 37 by fitting the damper hub 27 onto the hub shaft 15 and thereafter screwing the nut 30 onto the hub shaft 15. It is to be noted that the first sealing member 39 may be compressed not only by a wall contact of the second pushing portion 27b to the first cover member 37 from the inner circumferential side to the outer circumferential side of the first sealing member 39, but also by pushing a predetermined point of the first cover member 37 by the second pushing portion 27b between the inner circumferential side to the outer circumferential side of the first sealing member 39. Alternatively, a protrusion may be formed on the first cover member 37 at a level of the first sealing member 39 on an opposite side to protrude toward the engine side. In this case, the first sealing member 39 may be compressed by pushing the protrusion of the first cover member 37 by the second pushing portion 27b. A load applied to the first sealing member 39 may be increased by pushing the first cover member 37 at a point where the first sealing member 39 is situated. For this purpose, it is preferable to push a portion of the first cover member 37 at the level of the first sealing member 39 by the second pushing portion 27b. Optionally, the second cover member 38 may be integrated with the turbine hub 16. Accordingly, the damper hub 27 serves as the first pushing member, and the turbine hub 16 serves as the second pushing member.

Here will be briefly explained an assembly method of the vibration damping device. First of all, the turbine runner 5, the stator 12 or the pump impeller 2 are fitted onto the output shaft 14. In this situation, the turbine hub 16 integrated with the turbine runner 5, and the hub shaft 15 are fitted onto the output shaft 14. Meanwhile, the annular plate 29 holding the rolling mass 31 is set between the first cover member 37 and the second cover member 38 through the first sealing member 39 and the second sealing member 40, and the first cover member 37 and the second cover member 38 are fixed to each other by the welding method or the like. To this end, optionally, it is preferable to form an annular slit on an inner surface of each of the cover member 37 and 38 to individually hold the sealing members 39 and 40 therein.

By thus fixing the first cover member 37 to the second cover member 38, the dynamic damper 28 is assembled. Then, the dynamic damper 28 is fitted onto the hub shaft 15 to which the output shaft 14 is inserted to be brought into abutment with the turbine hub 16. Thereafter, the damper hub 27 to which the torsional damper 20 has already been attached, or the damper hub 27 before attaching the torsional damper 20 thereto is fitted onto the hub shaft 15 closely to the dynamic damper 28, and tightened by screwing the nut 30 onto the hub shaft 15.

Consequently, the first cover member 37 of the dynamic damper 28 is pushed tightly onto the annular plate 29 by the nut 30 through the damper hub 27. As a result, the first sealing member 39 is compressed tightly between the first cover member 37 and the annular plate 29, and the second sealing member 40 is compressed tightly between the annular plate 29 and the second cover member 38 that is pushed onto the turbine hub 16. That is, a clearance between the first cover member 37 and the second cover member 38 in the axial direction is reduced at the level where the sealing members 39 and 40 are situated by screwing the nut 30 onto the hub shaft 15 toward the turbine hub 16, and consequently the sealing members 39 and 40 are pressurized sufficiently to be compressed tightly. For this reason, the sealing ability of the cover member 36 can be enhanced to prevent an intrusion of the oil into the chamber holding the rolling mass.

In addition, an axial position of the annular plate 29 is fixed by the turbine hub 16 and the damper hub 27, and axial positions of the first cover member 37 and the second cover member 38 are also fixed by the turbine hub 16 and the damper hub 27. That is, the first cover member 37, the annular plate 29 and the second cover member 38 are tightened in the axial direction. For this reason, each clearance between the first cover member 37 and the annular plate 29, and between the annular plate 29 and the second cover member 38 will not be changed even if the first cover member 37, the annular plate 29 and the second cover member 38 are subjected to an axial load. That is, the sealing ability of the cover member 36 will not be worsened by an increment in the clearances between the first cover member 37 and the annular plate 29, and between the annular plate 29 and the second cover member 38. In other words, the sealing ability of the cover member 36 will not be worsened by a reduction in the pushing force applied to the sealing members 39 and 40. In addition, since the first cover member 37 and the second cover member 38 are held by the members fixed in the axial direction, the first cover member 37 and the second cover member 38 can be prevented from being inclined.

Thus, in the foregoing example, the damper hub 27 is pushed by the nut 30. According to the present application, however, the cover members 37 and 38 may also be pushed by other members in the axial direction. For example, the damper hub 27 may also be fixed to the hub shaft 15 by swaging an end portion of the damper hub 27 in such a manner as to restrict an axial movement toward the engine, or the turbine hub 16 may be fixed to the damper hub 37 by a rivet. Optionally, in order to prevent an intrusion of the oil into the chamber holding the rolling mass 31, the first sealing member 39 and the second sealing member 40 interposed between the first cover member 37 and the annular plate 29 and between the annular plate 29 and the second cover member 38 may be displaced to the radially outer side of the turbine hub 16 and the damper hub 27. In this case, since the first cover member 37, the annular plate 29 and the second cover member 38 are tightened in the axial direction as described, the sealing ability of the cover member 36 will not be worsened by an axial displacement of the first cover member 37, the annular plate 29 and the second cover member 38.

Figure 2:
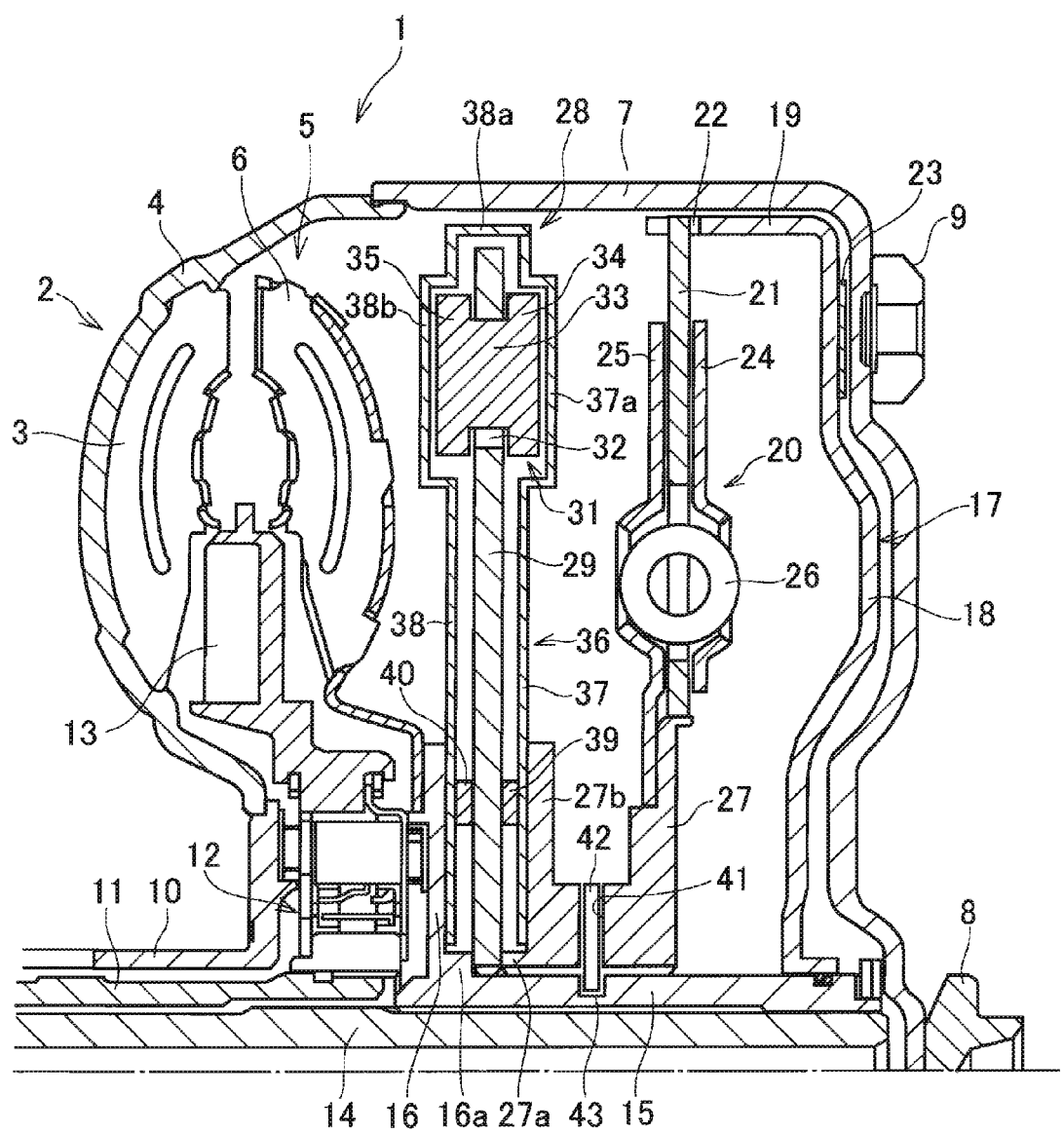
FIG. 2 is a cross-sectional view of the vibration damping device in which a damper hub is positioned by a pin.

In addition, as illustrated in FIG. 2, a position of the damper hub 27 may also be fixed by a pin 42 inserted into a through hole 41 penetrating through the damper hub 27 in the radial direction. In this case, a depression 43 is formed on an outer circumferential face of the hub shaft 15 at a point to be congruent with the through hole 41 of the damper hub 27 after assembling the dynamic damper 28, and the pin 42 is inserted into the depression 43 through the through hole 41 after fitting the damper hub 27 onto the hub shaft 15. Here, the pin 42 may be not only screwed into the depression 43 but also pushed into the depression 43 by a press-fitting method.

In the foregoing examples, the hub shaft 15 is integrated with the turbine hub 16, and the dynamic damper 28 and the damper hub 27 are fitted onto the hub shaft 15. However, the hub shaft 15 may also be integrated with the damper hub 27, and the dynamic damper 28 and the turbine hub 16 may also be fitted onto the hub shaft 15. In this case, an end portion of the turbine hub 16 of the transmission side may be tightened by a nut or swaged.

Figure 3:
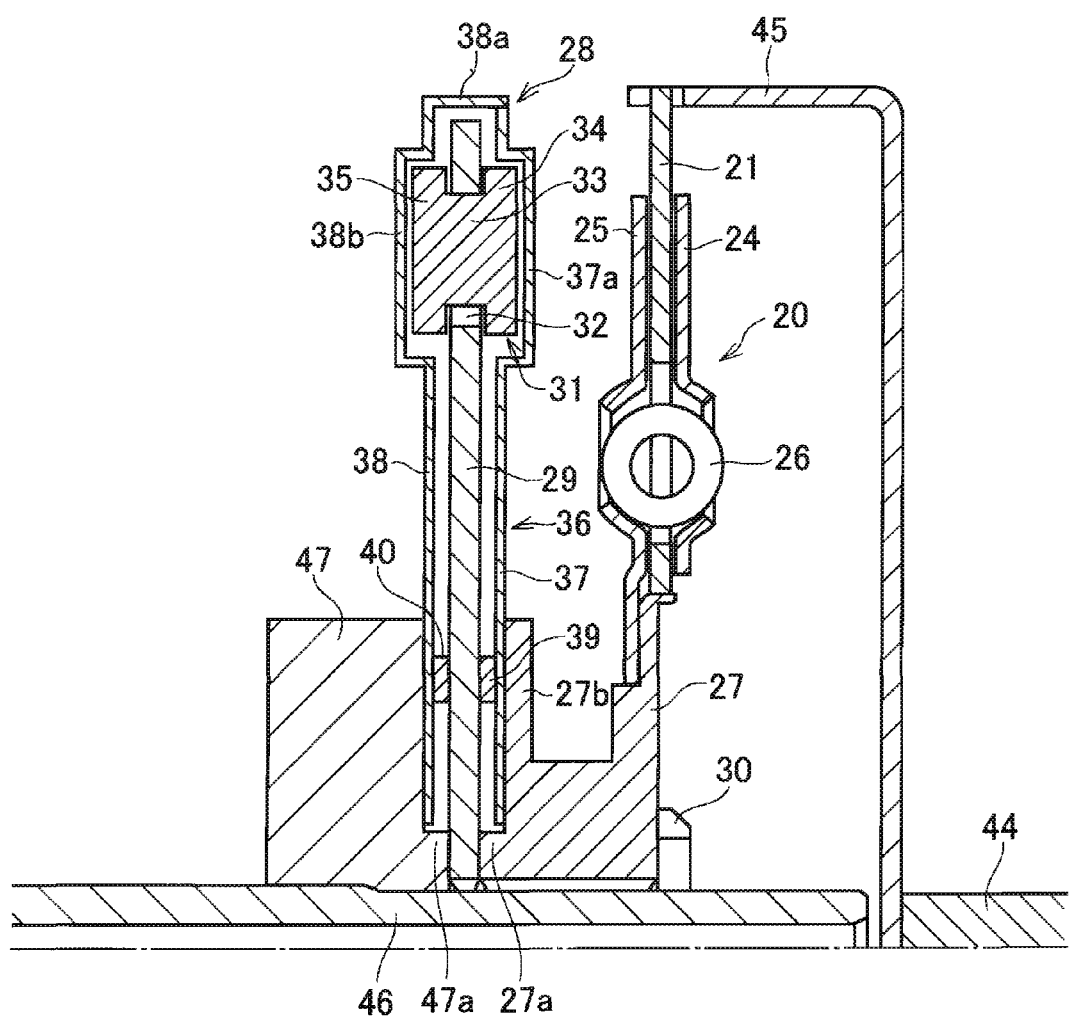
FIG. 3 is a cross-sectional view of the vibration damping device arranged on a site other than the torque converter.

In addition, according to the examples shown in FIGS. 1 and 2, the dynamic damper 28 is held in the torque converter 1. However, the dynamic damper 28 according to the present application may also be disposed between the engine and the torque converter 1, or on an output shaft of the transmission. In this case, it is also preferable to employ the above-explained structure for preventing an intrusion of the oil into the chamber holding the rolling mass 31. Turning now to FIG. 3, there is shown an example in which the dynamic damper 28 is employed in a hybrid vehicle that is not provided with the torque converter 1. In FIG. 3, common reference numerals are allotted to the elements in common with those in the example shown in FIG. 1, and detailed explanation for the common elements will be omitted.

In the example shown in FIG. 3, an annular flywheel 45 serving as a mass damper is connected to a crankshaft of the engine, and the torsional damper 20 is attached to the flywheel 45. Specifically, the input plate 21 of the torsional damper 20 is attached to an outer circumferential edge of the flywheel 45.

The second output plate 25 of the torsional damper 20 is attached to the damper hub 27, and the damper hub 27 is fitted onto an input shaft 46 of the transmission. A flange 47 is formed on the input shaft 46 to be opposed to the damper hub 27 so that the dynamic damper 28 is clamped by the damper hub 27 and the flange 47. Specifically, a protrusion 47a is formed on the flange 47 in such a manner as to protrude toward the engine, and the annular plate 29 is clamped by the protrusion 47a and the first pushing portion 27a. In this case, the cover members 37 and 38 are individually pushed by a lateral face of the flange 47 and the second pushing portion 27b of the damper hub 27. Thus, in the example shown in FIG. 3, the flange 47 has a same function as the turbine hub 16 shown in FIG. 1.

In this example, an intrusion of the oil into the chamber holding the rolling mass 31 may also be prevented. That is, the sealing ability of the cover member 36 can be enhanced while preventing a tilt of each of the cover member 37 and 38.

The invention claimed is:
1. A vibration damping device, comprising:
a holding member that is fitted onto a rotary member to suppress torsional vibrations on the rotary member while expanding radially outwardly;
a rolling mass that is held in the holding member while being allowed to oscillate in a rotational direction of the rotary member; and
a cover member that covers an oscillating range of the rolling mass liquid-tightly or air-tightly;
wherein the cover member includes a protrusion covering the oscillating range of the rolling mass in an oscillatable manner, a first flange that extends from the protrusion toward an inner circumferential side of the oscillating range on one of lateral faces of the holding member through a first sealing member, and a second flange that extends from the protrusion toward the inner circumferential side of the oscillating range on the other lateral face of the holding member through a second sealing member;
the vibration damping device further comprising:
a first pushing member that is fitted onto the rotary member while being prevented to move in an axial direction to push the first flange toward said one of lateral faces of the holding member to compress the first sealing member between the first flange and the holding member;

a second pushing member that is fitted onto the rotary member while being prevented to move in the axial direction to push the second flange toward the other lateral face of the holding member to compress the second sealing member between the second flange and the holding member;

a fluid coupling that hydraulically transmits an output torque of a prime mover to the rotary member; and a lockup clutch that transmits the output torque of the prime mover to the rotary member without the fluid coupling when it is engaged with an input member of the fluid coupling;

wherein the first pushing member includes a first connection member that transmits the output torque of the prime mover through the lockup clutch; and wherein the second pushing member includes a second connection member that transmits the output torque of the prime mover through the fluid coupling.

2. The vibration damping device as claimed in claim 1, wherein the holding member is disposed between the first pushing member and the second pushing member.

3. The vibration damping device as claimed in claim 1,
wherein any one of the first pushing member and the second pushing member is integrated with the rotary member,
wherein the vibration damping device further comprises a positioning member that fixes a position of an end face of any one of the other first pushing member and second pushing member opposite to a face thereof opposed to said one of the first pushing member and the second pushing member, and
wherein the first flange is pushed by the first pushing member and the second flange is pushed by the second pushing member by fixing the position of the end face of said any one of the other first pushing member and second pushing member.

4. The vibration damping device as claimed in claim 1,
wherein the first pushing member is adapted to push the first flange at a level where the first sealing member is situated, and
wherein the second pushing member is adapted to push the second flange at a level where the second sealing member is situated.

5. A vibration damping device, comprising:
a holding member that is fitted onto a rotary member to suppress torsional vibrations on the rotary member while expanding radially outwardly;
a rolling mass that is held in the holding member while being allowed to oscillate in a rotational direction of the rotary member; and a cover member that covers an oscillating range of the rolling mass liquid-tightly or air-tightly;

wherein the cover member includes a protrusion covering the oscillating range of the rolling mass in an oscillatable manner, a first flange that extends from the protrusion toward an inner circumferential side of the oscillating range on one of lateral faces of the holding member through a first sealing member, and a second flange that extends from the protrusion toward the inner circumferential side of the oscillating range on the other lateral face of the holding member through a second sealing member;

the vibration damping device further comprising:

a first pushing member that is fitted onto the rotary member while being prevented to move in an axial direction to push the first flange toward said one of lateral faces of the holding member to compress the first sealing member between the first flange and the holding member; and a second pushing member that is fitted onto the rotary member while being prevented to move in the axial direction to push the second flange toward the other lateral face of the holding member to compress the second sealing member between the second flange and the holding member;

wherein the first pushing member is adapted to push the first flange at a level where the first sealing member is situated, and wherein the second pushing member is adapted to push the second flange at a level where the second sealing member is situated.

6. The vibration damping device as claimed in claim 5, wherein the holding member is disposed between the first pushing member and the second pushing member.

7. The vibration damping device as claimed in claim 5,
wherein any one of the first pushing member and the second pushing member integrated with the rotary member,
wherein the vibration damping device further comprises a positioning member that fixes a position of an end face of any one of the other first pushing member and second pushing member opposite to a face thereof opposed to said one of the first pushing member and the second pushing member, and
wherein the first flange is pushed by the first pushing member and the second flange is pushed by the second pushing member by fixing the position of the end face of said any one of the other first pushing member and second pushing member.

* * * * *

UNITED STATES PATENT AND TRADEMARK OFFICE
CERTIFICATE OF CORRECTION

PATENT NO. : 9,556,944 B2
APPLICATION NO. : 15/037890
DATED : January 31, 2017
INVENTOR(S) : Tadashi Sekiguchi It is certified that error appears in the above-identified patent and that said Letters Patent is hereby corrected as shown below:

Column 1, Line 39, change "the second pushing member integrated" to --the second pushing member is integrated--

Signed and Sealed this
Tenth Day of April, 2018

Andrei Iancu
*Director of the United States Patent and Trademark Office*